(12) United States Patent
Timpe et al.

(10) Patent No.: US 6,974,327 B2
(45) Date of Patent: Dec. 13, 2005

(54) DOUBLE IMPUTATION SCALE

(76) Inventors: Roy Harold Timpe, 366 Blandon Meadows Pkwy., Blandon, PA (US) 19510; Allan Robert Vivona, 49 Water St., Fleetwood, PA (US) 19522

( * ) Notice: Subject to any disclaimer, the term of this patent is extended or adjusted under 35 U.S.C. 154(b) by 68 days.

(21) Appl. No.: 10/814,045

(22) Filed: Mar. 31, 2004

(65) Prior Publication Data

US 2005/0239025 A1   Oct. 27, 2005

(51) Int. Cl.[7] .............................................. G09B 19/00
(52) U.S. Cl. ...................................................... 434/245
(58) Field of Search ................................ 434/245, 188, 434/194

(56) References Cited

U.S. PATENT DOCUMENTS

| | | | | |
|---|---|---|---|---|
| 3,928,923 A | * | 12/1975 | Harte | 434/194 |
| 4,106,220 A | * | 8/1978 | Hurd | 434/194 |
| 4,713,009 A | * | 12/1987 | Borenson | 434/188 |
| 4,731,022 A | * | 3/1988 | Garland | 434/194 |
| 4,756,692 A | * | 7/1988 | Pranger | 434/245 |
| 4,871,314 A | * | 10/1989 | Shih | 434/194 |
| 5,152,535 A | * | 10/1992 | Roberts | 273/249 |
| 5,224,862 A | * | 7/1993 | Sullivan | 434/129 |
| 5,295,834 A | * | 3/1994 | Saunders | 434/128 |
| 5,425,643 A | * | 6/1995 | Strickland | 434/194 |
| 5,449,177 A | * | 9/1995 | Naylor | 273/236 |
| 5,529,308 A | * | 6/1996 | Masakayan | 273/243 |
| 5,924,869 A | * | 7/1999 | Haas | 434/245 |
| 6,053,792 A | * | 4/2000 | Sallee et al. | 446/81 |
| 6,322,369 B1 | * | 11/2001 | Patterson et al. | 434/245 |

* cited by examiner

*Primary Examiner*—Kurt Fernstrom

(57) ABSTRACT

An educational device to teach the biblical doctrine of double imputation is disclosed. The educational device is generally comprised of a cross, a balance type scale, and at least three different objects which by casual observation are of unequal mass.

17 Claims, 5 Drawing Sheets

DOUBLE IMPUTATION SCALE

FIELD OF THE INVENTION

This invention relates to the field of religious instruction, and presenting the gospel.

BACKGROUND

In soteriology, double imputation is the doctrine where the Christian's sins are imputed to Christ, and Christ's righteousness is imputed to the Christian. Often in the presentation of the gospel the concept of double imputation is ignored. More often, a single imputation is presented where simply the Christian's sins are imputed to Christ. Failure to grasp the doctrine of double imputation can result in the person not having a biblical view of assurance. Sadly in many cases, both double and single imputation are not properly understood, and a "salvation by works" is actually taught (i.e. if your good deeds outweigh you evil deeds you go to heaven).

SUMMARY OF THE INVENTION

DETAILED DESCRIPTION OF THE ILLUSTRATIVE EMBODIMENTS OF THE INVENTION

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology and terminology employed herein is for the purpose of description and not limitation.

Throughout the process the instructor, or teacher, will manipulate the balance, the masses, and the cross to achieve the configurations in the five figures.

Figure 1:
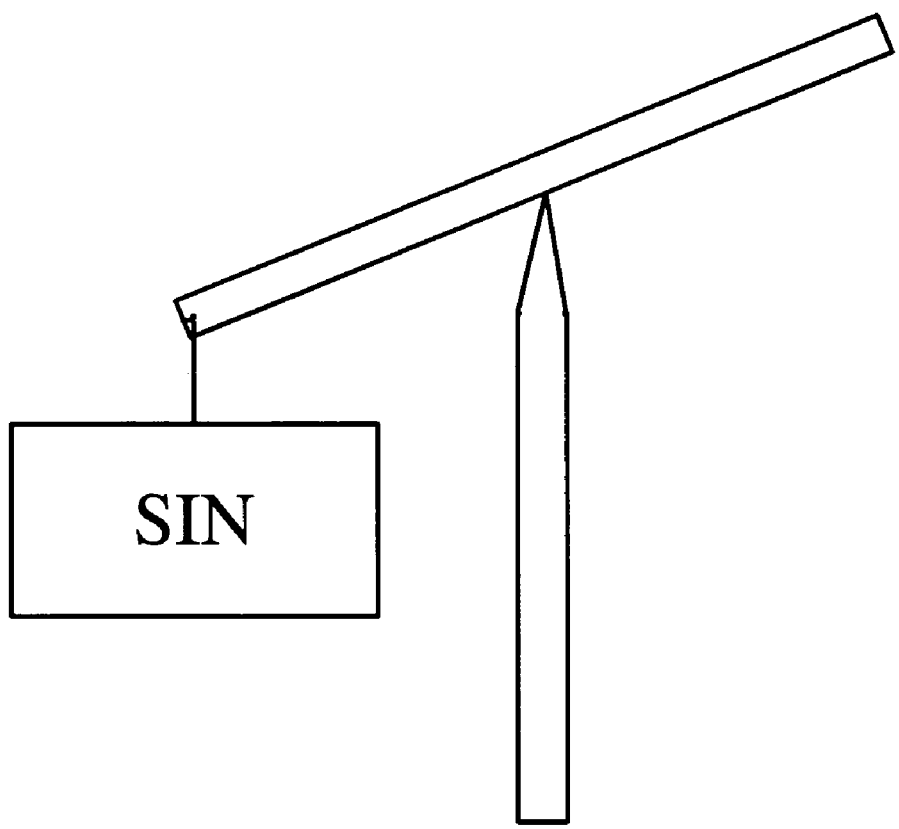
FIG. 1 shows the balance in the initial condition.

FIG. 1 shows the balance in the initial condition. The balance has an object representing sin on one side such that the balance is clearly tilted toward the side with the object. This represents the person without Christ. He has the weight of his own sins, as well as "original sin" on his balance. His condition is hopeless.

Figure 2:
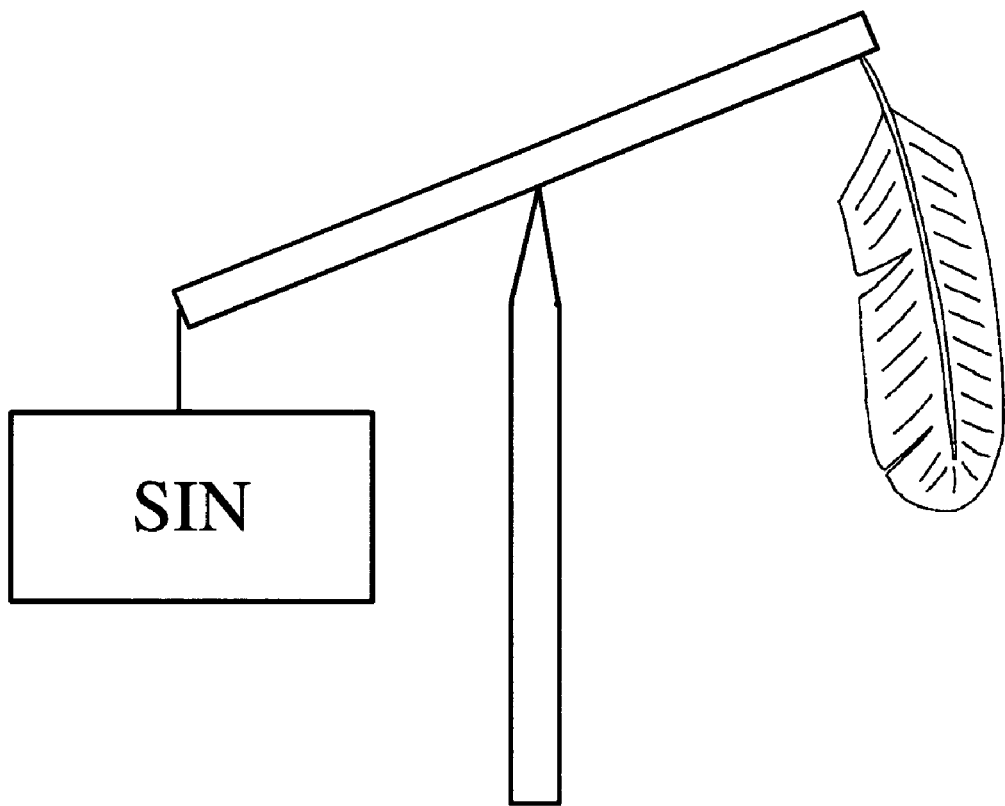
FIG. 2 shows the effect of using good works to negate sin.

FIG. 2 shows the effect of good works on the balance. The object (or objects) representing "good works" must be of less mass than the object representing sin.

Figure 3:
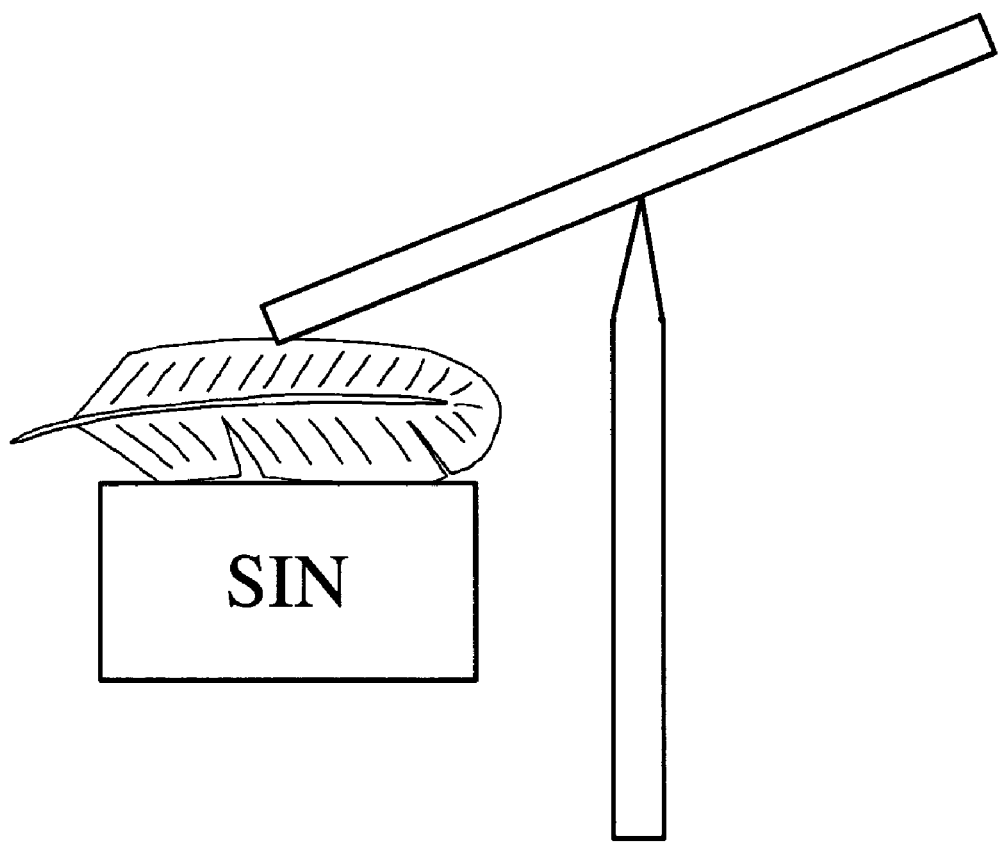
FIG. 3 shows that good works done without Christ are the same as sin.

FIG. 3 shows that good works are often done for the wrong motives. Good works done with evil motive are, in fact, sin and belong on the side of the balance with the object representing sin.

Figure 4:
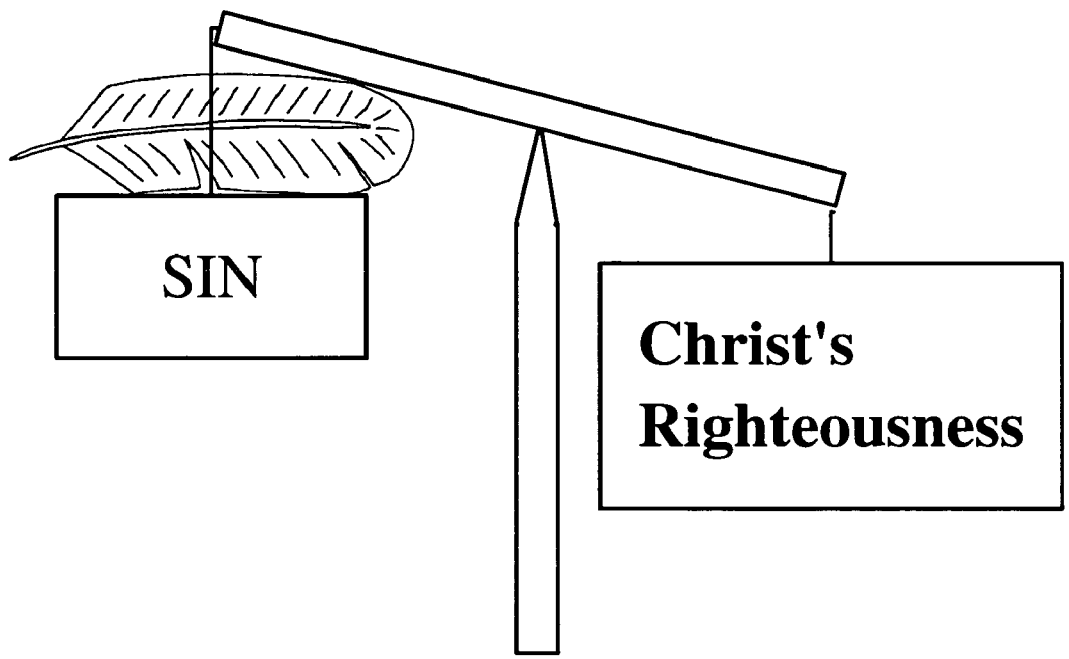
FIG. 4 shows that Christ's Righteousness is more than adequate to negate our sin.

FIG. 4 shows the immediate effect of the person coming to Christ. Christ's righteousness is imputed to the sinner and is of sufficient weight to cancel out the effects of all sin.

Figure 5:
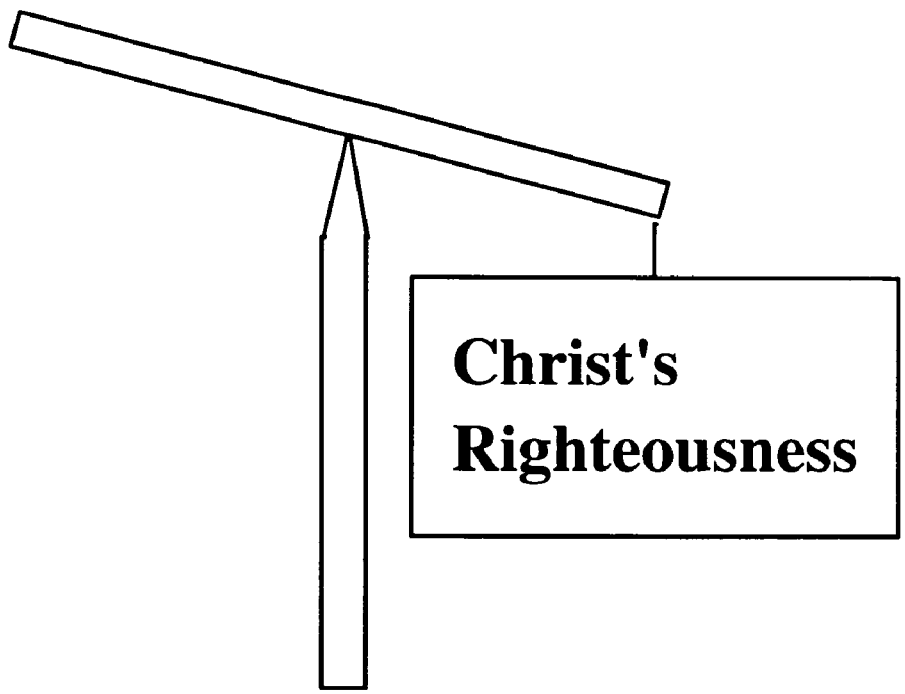
FIG. 5 shows the final condition of the person who comes to Christ.
Figure 5:
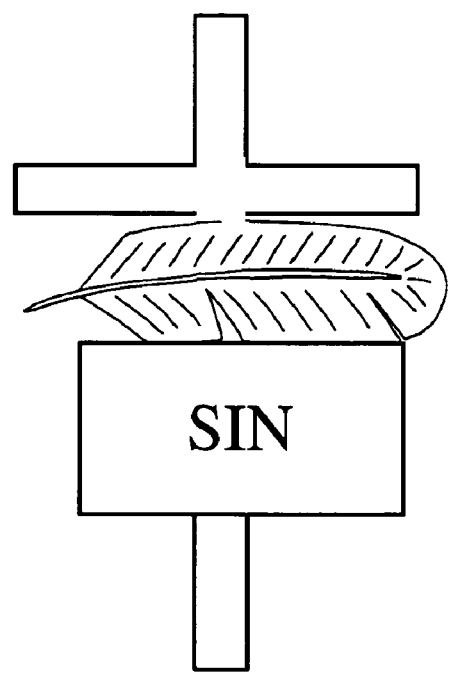

FIG. 5 shows the final condition of the person coming to Christ. Not only has Christ's righteousness been imputed to the sinner, but all the person's sins have been imputed to Christ, and are on the cross, having been paid for in full by Christ's finished work on the cross.

In fact, the conditions depicted in FIG. 4 and FIG. 5 occur simultaneously, but are shown in two steps to aid in the student's understanding.

While it will be apparent that the preferred embodiment of the invention herein disclosed is well calculated to fulfill the objects above-stated, it will be appreciated that the invention is susceptible to modifications, variation and change without departing from the proper scope or fair meaning of the subjoined claims.

We claim:

1. A method of instructing and communicating a biblical doctrine of double imputation utilizing a balance beam scale apparatus and a cross having an attachment member, comprising the steps of;

placing a first object representing sin on one side of said balance beam scale apparatus, said first object having a first weight so that said balance beam scale apparatus becomes unbalanced toward said one side;

placing a second object representing good works on a second side of said balance beam scale apparatus opposing said one side, said second object having a second weight substantially less than said first weight so that said balance beam scale apparatus remains unbalanced toward said one side;

removing said second object from said second side to said one side;

placing a third object representing Christ's righteousness on said second side of said balance beam scale apparatus, said third object having a third weight that is substantially greater than the combined first and second weights, so that said balance beam is now unbalanced toward said second side; and removing all objects from said one side of said balance beam scale apparatus and placing at least said first object onto said attachment member of said cross.

2. The method of claim 1 wherein said step of placing a second object on said second side is repeated to represent multiple good works, said first weight remaining substantially greater than the combined said second weights on said second side so that said balance beam scale apparatus remains unbalanced toward said one side.

3. The method of claim 1 wherein said step of removing all objects on said one side includes the step of:

removing all objects from said one side of said balance beam scale apparatus, but placing only said first object on said attachment member of said cross.

4. The method of claim 1 wherein said step of removing all objects on said one side includes the step of:

removing all objects from said one side of said balance beam scale apparatus, and placing all of said objects from said one side of said balance beam scale apparatus on said attachment member of said cross.

5. The method of claim 1 wherein said first object is visibly identified as representing sin.

6. The method of claim 5 wherein said third object is visibly identified as representing Christ's righteousness.

7. The method of claim 6 wherein said first and third objects are labeled with the words sin and Christ's righteousness, respectively.

8. The method of claim 6 wherein said second object is a feather.

9. The method of claim 6 wherein said attachment member on said cross is a hook operable to receive said first and second objects.

10. A method of instructing and communicating a biblical doctrine of double imputation utilizing a balance beam scale apparatus having a support member pivotally supporting a balance beam, and a cross having an attachment member, comprising the steps of;

unbalancing said scale apparatus by supporting a first object representing sin on a first side of said balance beam, said first object having a first weight so that said balance beam becomes unbalanced toward said first side;

demonstrating the effects of good works by placing a second object representing good works on a second side of said balance beam opposite said support member from first side, said second object having a second weight substantially less than said first weight so that said balance beam remains unbalanced toward said first side;

representing the effect of imputing Christ's righteousness to a sinner by placing a third object representing Christ's righteousness on said second side of said balance beam, said third object having a third weight that is substantially greater than first weight, so that said balance beam is now unbalanced toward said second side; and removing all objects from said first side of said balance beam scale apparatus and placing said first object onto said attachment member of said cross to reflect the imputation of human sins to Christ.

11. The method of claim 10 wherein said demonstrating step includes the placement of a plurality of said second objects on said first side to represent multiple good works, said first weight remaining substantially greater than the combined said second weights on said second side so that said balance beam remains unbalanced toward said first side.

12. The method of claim 11 further comprising the step of:

showing that good works sometimes have ulterior motives by moving at least one of said second objects from said second side to said first side.

13. The method of claim 10 wherein said step of removing all objects on said first side includes the step of:

removing all objects from said one side of said balance beam scale apparatus, and placing all of said objects from said one side of said balance beam scale apparatus on said attachment member of said cross.

14. The method of claim 10 wherein said step of removing all objects on said first side includes the step of:

removing all objects from said first side of said balance beam, and placing only said first object on said attachment member of said cross.

15. Apparatus for instructing and communicating a biblical doctrine of double imputation, comprising:

a balance beam scale apparatus having a support member pivotally connecting a balance beam having a first side and a second side opposite of said support member from said first side, each of said first and second sides having a support member for supporting objects therefrom;

a cross having an attachment member;

a first object representing sin being supportable from said support member on said first side of said balance beam, said first object having a first weight;

a second object representing good works being selectively supportable on both said first and second sides, said second object having a second weight substantially less than said first weight such that said balance beam scale apparatus would be unbalanced toward said first side when said first object is supported on said first side and said second object is supported on said second side; and a third object representing Christ's righteousness being supportable from said support member on said second side, said third object having a third weight that is substantially greater than the combined first and second weights, such that said balance beam would be unbalanced toward said second side when said first and second objects were supported from said first side and said third object was supported from said second side, said first and second objects being removable from said support member on said first side and supported from said attachment member on said cross.

16. The apparatus of claim 15 wherein multiple second objects are supportable from said support member on said second side, the combined second weights of said multiple second objects being less that said first weight, said third weight being greater than the combined second weights of said multiple second objects added to said first weight.

17. The apparatus of claim 16 wherein said second objects are formed from feathers.

* * * * *